(12) United States Patent
Leleve

(10) Patent No.: US 6,586,884 B2
(45) Date of Patent: Jul. 1, 2003

(54) METHOD AND DEVICE FOR MANAGING THE SUPPLY TO A DISCHARGE LAMP

(75) Inventor: Joël Leleve, Bobigny Cedex (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 10/115,345

(22) Filed: Apr. 2, 2002

(65) Prior Publication Data

US 2003/0001508 A1 Jan. 2, 2003

(30) Foreign Application Priority Data

Apr. 5, 2001 (FR) .............................. 01 04757

(51) Int. Cl.⁷ .............................................. H05B 37/02
(52) U.S. Cl. ........................ 315/82; 315/159; 307/10.8
(58) Field of Search ..................... 315/82, 83, 156, 315/157, 158, 159; 307/10.8

(56) References Cited

U.S. PATENT DOCUMENTS

| 5,103,143 A | | 4/1992 | Daub ......................... 315/308 |
| 5,666,028 A | * | 9/1997 | Bechtel et al. ................ 315/82 |
| 5,962,990 A | | 10/1999 | Kern ........................... 315/307 |

FOREIGN PATENT DOCUMENTS

DE 197 43 580 A1 4/1999

* cited by examiner

*Primary Examiner*—David Vu
(74) *Attorney, Agent, or Firm*—Morgan & Finnegan, LLP

(57) ABSTRACT

The invention relates to a method for managing the supply to a discharge lamp of a motor vehicle headlight, wherein during the phase of starting up the discharge lamp, the strength of the current supplied to the lamp is controlled on the basis of a parameter representative of the environment of the vehicle so as to optimize the life of the discharge lamp. The invention also relates to a device for managing the supply to a discharge lamp.

12 Claims, 3 Drawing Sheets

METHOD AND DEVICE FOR MANAGING THE SUPPLY TO A DISCHARGE LAMP

Figure 1:
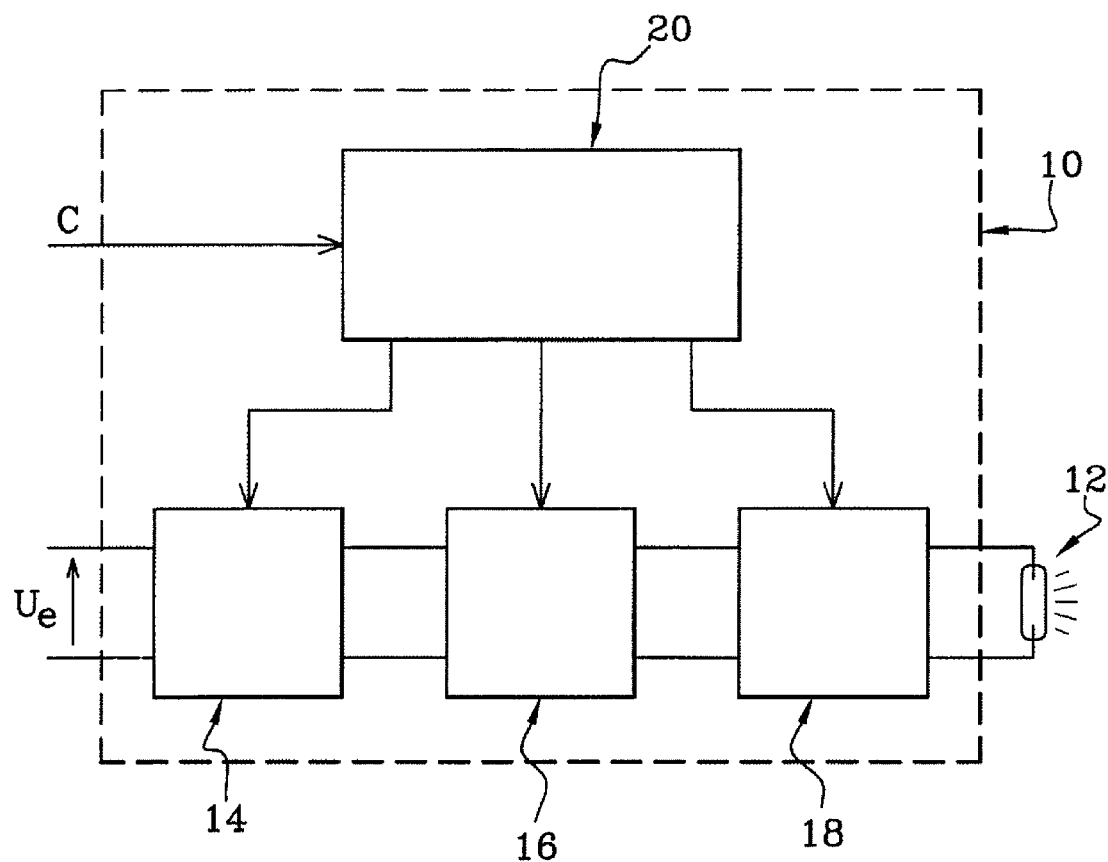

The invention proposes a method of managing the supply to a discharge lamp of a motor vehicle headlight.

The invention also proposes a device for managing the supply to a discharge lamp of a motor vehicle headlight.

A discharge lamp consists in particular of two electrodes. The emission of a light flux is due to the creation of an electric arc of light between the two electrodes. To do this, it is necessary to create a significant potential difference between the two electrodes which are arranged in a hermetic bulb, and which are separated from one another by a predetermined distance which may, for example, be 4 mm.

The bulb is generally made of glass, particularly quartz glass, and is filled with a gas such as xenon at a high pressure, with metal salts and with halides in the solid state.

The electric arc struck in the xenon by the action of the switch-on command, supplies the energy needed to evaporate the metal salts and the halides, thus giving rise to the emission of a light flux.

The discharge lamp is supplied through a supply device also known as ballast which activates the lamp and thereafter allows it to operate in a stabilized state at an operating point that is determined by the characteristics of the lamp and the service that it is to provide.

Activation of the lamp may be broken down into a striking phase and a phase of starting-up or warming-up the lamp during which the light flux emitted by the lamp increases until it reaches the predetermined operating point of the lamp.

The striking phase is very short. It allows the electric arc to form between the two electrodes.

During the start-up phase, as is known, the lamp is supplied with a first predetermined current which, in a predetermined length of time, allows the light flux emitted by the lamp to reach the predetermined light flux which corresponds to the operating point of the lamp.

The start-up phase allows the electrodes, and other components of the lamp, such as the gas contained in the bulb, to heat up and reach their operating temperature, allowing the lamp optimum efficiency and optimum light flux.

For example, for the light flux of the lamp to reach 80% of the predetermined flux in two seconds, the lamp is supplied with a supply current of 2.6 amperes.

That makes it possible, when the user switches on his vehicle headlights, for the light flux provided by these quickly to be enough to satisfactorily illuminate the road.

Thereafter, when the lamp is operating in a stabilized state, the supply current to the lamp is reduced to a value of the order of 0.4 ampere.

However, the first predetermined current imposed during the start-up phase causes accelerated ageing of the lamp and this is associated with the evaporation of the electrodes and with the mechanical stresses on the components of the lamp, these being due in particular to the sharp variation in temperature.

In consequence, the life of the lamp is greatly reduced. Indeed, a discharge lamp equipping a vehicle, the headlights of which are switched on only by night, has a life of about 3000 hours, whereas the same bulb can achieve a longer life when the switch-on frequency is lower, for example when the headlights are switched on as soon as the vehicle is started, that is to say even by day.

In order to minimize the ageing of the electrodes, the invention proposes a method of managing the supply to a discharge lamp of a motor vehicle headlight, characterized in that, during the phase of starting up the discharge lamp, the strength of the current supplied to the lamp is controlled on the basis of a parameter representative of the environment of the vehicle so as to optimize the life of the discharge lamp.

According to other features of the invention:
the strength of the current and/or the power supplied to the lamp is limited to a value which is predetermined on the basis of the brightness outside the vehicle;
the parameter is representative of the future change in brightness outside the vehicle.

The invention also proposes a device for managing the supply to a discharge lamp of a motor vehicle headlight, which comprises in particular a device for supplying the discharge lamp which controls the strength of the current supplied to the discharge lamp according to the method according to the process of the type described hereinabove, characterized in that it comprises a device for measuring the brightness outside the vehicle.

Figure 2:
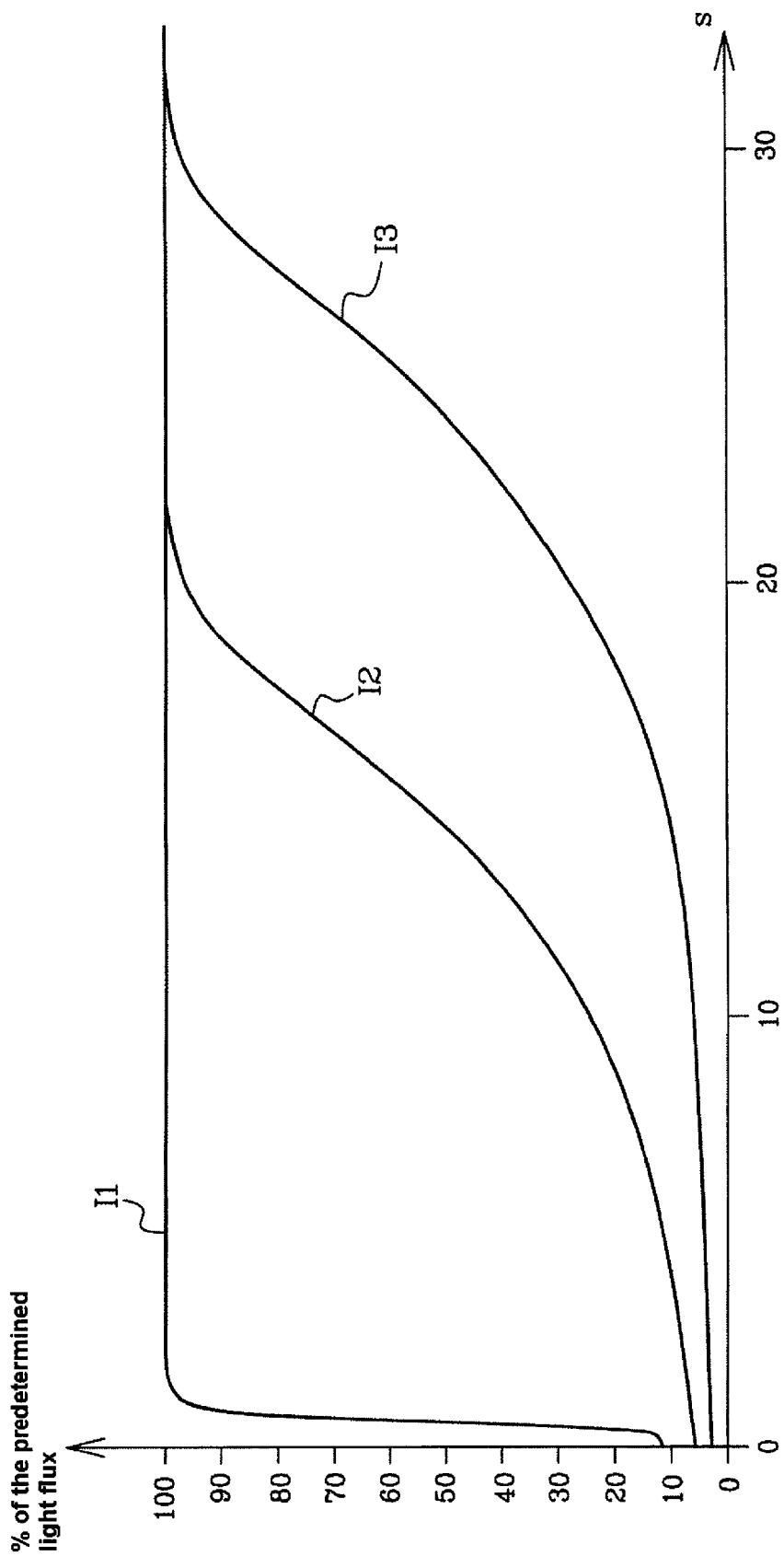
Figure 3:
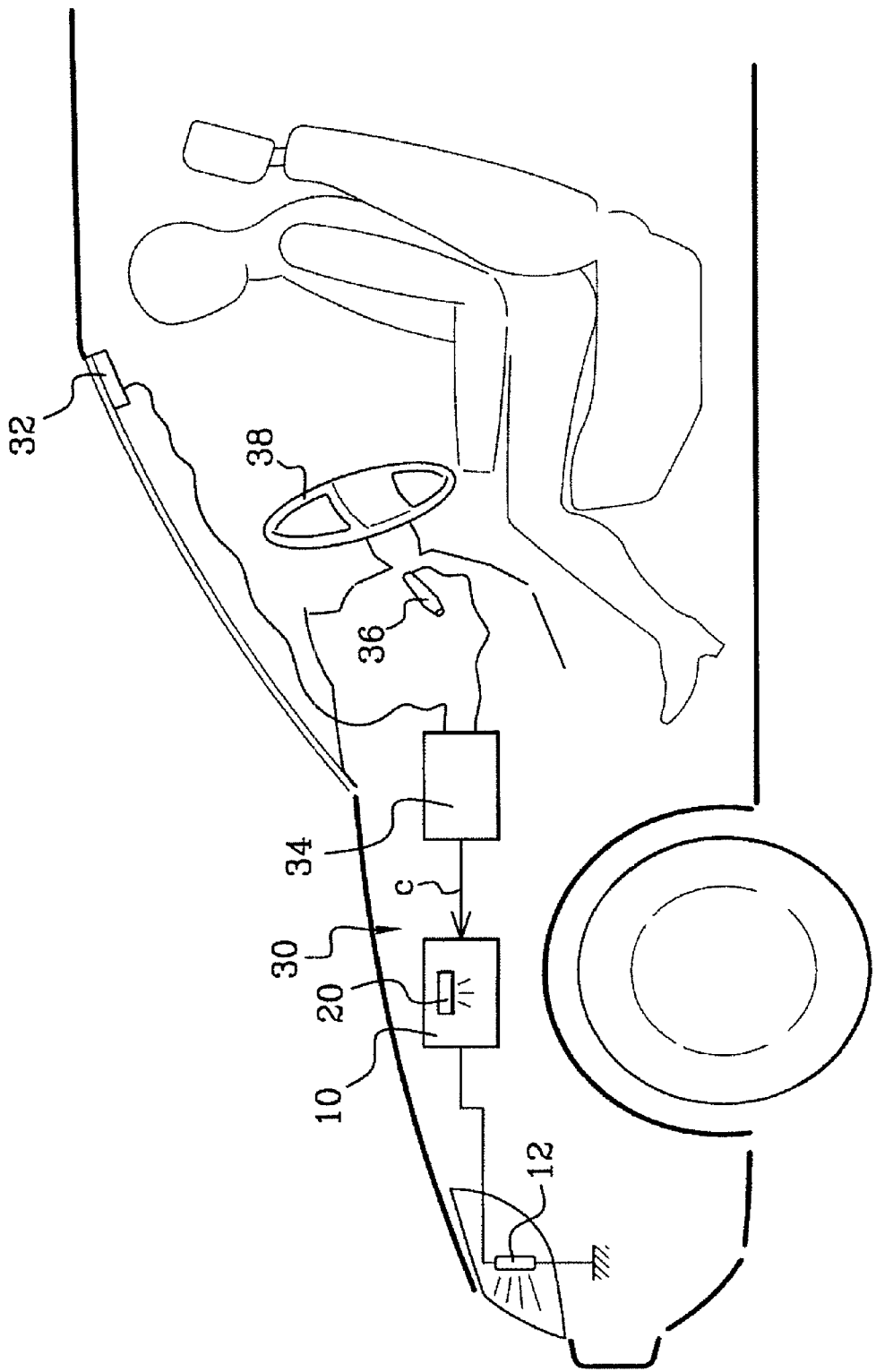

According to yet other features of the invention:
the measurement device comprises an external-brightness sensor;
the brightness sensor is designed to be arranged on the inside of a transparent wall, such as the windscreen of the vehicle or the headlight glass;
the measurement device comprises a mapping system which provides the parameter representative of the vehicle environment on the basis of the location of the vehicle with respect to predetermined places such as a tunnel Other features and advantages of the invention will become apparent from reading the detailed description which follows, for an understanding of which reference will made to the appended drawings in which:

FIG. 1 schematically depicts a device for supplying a discharge lamp;

FIG. 2 is a diagram illustrating the change in light flux emitted by a discharge lamp as a function of time for several strengths of current supplied to a discharge lamp;

FIG. 3 schematically depicts a device for managing the supply to a discharge lamp which is achieved according to the invention.

As has been depicted in FIG. 1, the device 10 for supplying the discharge lamp 12 comprises, mounted in series, a converter 14 for converting a DC voltage into another DC voltage, or DC/DC converter, a converter 16 for converting DC voltage into AC voltage, or DC/AC converter, and a stage 18 for striking the lamp 12, all of which are controlled by an electronic control unit 20.

The DC/DC converter 14 is supplied with the vehicle battery voltage, or input voltage $U_e$, and comprises, for example, a transformer.

The DC/AC converter 16 comprises, for example, an H-bridge of four semiconductor switches (not depicted) which are controlled by the electronic control unit 20.

A striking stage 18 makes it possible in particular to produce a high voltage pulse during a phase known as the phase of striking the discharge lamp 12, which precedes the start-up phase also known as the warm-up phase, then a phase of operation in a stabilized state.

The supply device 10 thus makes it possible for the discharge lamp to be supplied in such a way as to activate it, that is to say to set up the electric arc, then to increase the light flux emitted during the start-up phase.

However, as described previously, the current supplied to the discharge lamp 12 during the start-up phase is predetermined in such a way as to allow the light flux to increase up to the predetermined light flux that corresponds to the predetermined operating point of the lamp during a first predetermined time.

During the start-up phase, the supply device 10 controls the power supplied to the discharge lamp 12 with a maximum of 75 watts and manages the transition to the phase of operation in a stabilized state at 35 watts. During this phase, the image of the current strength is the most significant value in managing the power supplied to the lamp 12.

For this reason, in what follows of the description, only the value of the current strength will be expounded upon, in the knowledge that power is linked directly to it through a proportionality relationship.

In the remainder of the description, the values of current strength, and the times indicated, are given by way of example for a type of lamp 12 of the regulation D1 or D2 type, under determined conditions of use.

According to the curve $l_1$ in FIG. 2 and in the customary way, the lamp 12 is supplied with a current of a strength of the order of 2.6 amperes. This supply current allows a short start-up time, that is to say that the light flux emitted by the lamp 12 reaches more than 80% of the predetermined light flux corresponding to the operating point of the lamp 12 a few seconds after activation of the lamp 12. Such an activation time is satisfactory with respect to the standards currently in force.

The value of 2.6 amperes corresponds to the maximum strength of supply current allowed by the standards currently in force for vehicles running on the public highway.

Now, supplying a supply current with a strength of the order of 2.6 amperes for a few seconds gives rise to accelerated ageing of the electrodes and greatly reduces the life of the discharge lamp 12.

Each activation of the discharge lamp 12 is the equivalent of about 5 minutes of operation of the lamp 12 when it is in its phase of operation in a stabilized state.

Although under certain conditions it is necessary for the light flux to increase swiftly to allow effective illumination, particularly by night, there are other situations in which the increase in light flux can be far more gentle, particularly when the headlights are switched on during the day.

What happens in this case is that the function of the headlights is not to illuminate the road in order to allow the driver to see it properly, but to allow the vehicle to be seen from further away by the users of other vehicles. Thus, if the increase in light flux to reach the predetermined flux of the phase of operation in a stabilized state is long, that is to say lasts several tens of seconds, this will have practically no impact on safety.

In order to minimize the ageing of the electrodes to optimize the life of the discharge lamp 12, the invention proposes a method for managing the supply to the lamp 12 which controls the strength of the current and/or the power supplied to the discharge lamp 12 on the basis of a parameter representative of the environment of the vehicle, during the start-up phase of the discharge lamp 12.

Thus, when the vehicle is in an environment which requires a swift rise in the light flux supplied by the discharge lamp 12, the strength of the current supplied to the lamp is set to a predetermined maximum value which may be of the order of 2.6 amperes.

Conversely, when the vehicle is moving through an environment which does not dictate a swift rise in light flux, the power supplied to the lamp 12 and/or the strength of its supply current are set to other predetermined values which may be of the order of a few tenths of an ampere in the case of the current strength, and about 40 watts in the case of the maximum power.

FIG. 2 depicts two other examples of the change in light flux for two different strengths of supply current.

Curve $l_2$ is obtained with a current strength of 0.9 ampere supplied to the lamp 12. In this case, the flux emitted by the lamp 12 reaches 100% of the predetermined flux after a time of the order of 20 seconds.

Curve $l_3$ is obtained with a current strength of 0.6 ampere supplied to the lamp 12. In this case, the flux emitted by the lamp 12 reaches 100% of the predetermined flux after a time of the order of 30 seconds.

Thus, when activating the discharge lamp 12 according to the curve $l_3$, the ageing of the electrodes and the mechanical fatigue of the components of the lamp 12 are greatly reduced by comparison with the ageing experienced when the lamp 12 is activated according to the curve $l_1$. Each time the lamp 12 is activated according to the curve $l_3$, the life of the lamp 12 is extended by several minutes by comparison with the state of the art in which the lamp 12 is always activated according to the curve $l_1$.

According to the invention, to each value of the parameter representative of the environment of the vehicle, there corresponds a predetermined strength of supply current and a maximum power which make it possible to reach a compromise between the rate of increase of the intensity of the light flux and the acceleration of the ageing of the electrodes according to the environment of the vehicle.

The life of the lamp 12 is thus greatly increased. In very specific cases which occur rarely, the invention allows an even more rapid increase in the light flux emitted than when the lamp 12 is supplied with a current of 2.6 amperes. This relates in particular to passing through a tunnel.

What happens in this case is that the vehicle moves very quickly from a situation in which starting up the discharge lamps 12 can be slow to a situation in which start up needs to be quick. In addition, the vehicle is then likely to travel at a high speed which requires perfect view of the road. Now, the start-up time represented by the curve $l_1$ may prove to be too long.

The invention allows the strength of the supply current to be set to a value higher than 2.6 amperes in order to reduce the start-up time. However, the strength of the supply current must not exceed a predetermined value which would cause total deterioration of the electrodes.

The reduction in the life of the discharge lamp 12 for start-up of this type is greater than the reduction in the life for a start-up with a current of 2.6 amperes. However, the overall life of the discharge lamp 12 is practically unaffected, this type of situation being very rare by comparison with the total number of start-ups of the lamp 12 during its life.

Start-up of this type thus makes it possible to improve driving comfort, and safety, without significantly reducing the overall life of the lamp 12.

Of course, the standards currently in force restrict the value of the strength of the supply current of vehicles running on the public highway to 2.6 amperes. At the present time, vehicles which do not run on the public highway, such as site plant and forestry vehicles may be allowed to exceed this value.

It must be remembered that the invention proposes, in particular cases, to reduce the life of the lamps slightly in order to allow an increase in driving comfort and user safety. For that, the strength of the supply current may temporarily exceed the strength of the current supplied to the lamps 12 during activation under a common situation, such as activation by night when starting the vehicle.

The parameter representative of the environment of the vehicle may be representative of the brightness outside the vehicle. In this case, the value of the parameter may be proportional to the external brightness.

Thus, if the driver switches on the headlights of his vehicle while he is driving at nightfall, the value of the parameter representing the external brightness has a medium value. The strength of the current supplied to the discharge lamp 12 may be set to a medium value which may, for example, be 0.9 ampere. In this case, the light flux emitted by the lamp 12 increases in such a way as to reach the predetermined flux value in an average length of time which may be of the order of some twenty seconds, in accordance with the curve $l_2$.

If the driver switches on the headlights of the vehicle when night has fallen, the light flux emitted by the lamp needs to increase rapidly so as to reach the predetermined flux value in a shorter length of time.

To do this, the method of managing the supply to the lamp 12 sets the strength of the supply current to a value higher than the previous one and which may, for example, be 2.6 amperes. In this case, the flux emitted by the lamp 12 reaches the predetermined flux value in a short time which may be of the order of 2 to 3 seconds, in accordance with curve $l_1$.

Similarly, when the driver switches on the headlights of the vehicle during the day, the method of managing the supply sets the strength of the current supplied to the lamp to a value which may be of the order of several tenths of an ampere. In this case, the light flux may take several tens of seconds to reach the predetermined flux.

The parameter representative of the environment may also be representative of the future change in brightness outside the vehicle. In this case, the representative parameter makes it possible to anticipate the change in brightness outside so as to optimize the life of the discharge lamp.

Anticipating the change in external brightness is highly advantageous in the event of a sharp variation in external brightness.

For example, when the vehicle enters a tunnel, the brightness outside the vehicle drops very sharply. If the lamps 12 of the vehicle headlights are switched on before the tunnel is entered, the brightness outside the vehicle is high which means that, if the parameter taken into consideration for controlling the strength of the supply current does not anticipate the change in external brightness, the management method will set the strength of the current supplied to the lamp to a low value which may be of the order of several tenths of an ampere.

As the vehicle enters the tunnel, if the driver has not had his headlights switched on for several tens of seconds, the intensity of the light flux emitted by the discharge lamp 12 will not be high enough to illuminate the road satisfactorily. That may increase the risk of an accident.

When the parameter representative of the environment is representative of the future change in brightness outside the vehicle, it makes it possible to predict the presence of the tunnel.

In consequence, the strength of the current supplied to the discharge lamp 12 will be controlled not on the basis of the brightness outside the vehicle when the lamp 12 is switched on, but rather on the basis of the presence of the tunnel. Thus, although the brightness outside the vehicle is high, the strength of the current supplied to the lamp 12 will be set to a value which will advantageously be determined on the basis of the distance between the vehicle and the tunnel, and the speed of the vehicle, that is to say on the basis of the predicted time between switching the lamps 12 on and the vehicle entering the tunnel. If this time is of the order of several tens of seconds, the current strength may be 0.6 ampere. If this time is of the order of several seconds, the current may be 2.6 amperes.

According to the invention, the method can also control the strength of the current supplied to the discharge lamp 12 on the basis of the temperature of its electrodes. Specifically, it is known that the rate of increase of light flux depends on the strength of the supply current and also on the temperature of the electrodes. The closer the electrode temperature is to the operating temperature, the lower the supply current may be for a constant rate of increase of light flux.

The electrode temperature may be estimated, for example on the basis of the strength of the current taken to start up the discharge lamp 12.

To simplify the management of the supply, particularly of the electronic control unit 20, the control of the strength of the supply current may consist in limiting the current strength to a value predetermined on the basis of the parameter representative of the environment.

The strength of the current supplied to the discharge lamps 12 of the headlights of a motor vehicle on the basis of a parameter representative of the environment of the vehicle may be controlled continuously. That is to say that to each value of the representative parameter there corresponds a value of supply current strength.

According to an alternative, the strength of the current supplied to the lamps 12 may be controlled in stages. In this case, the range of variation of the value of the parameter is split into several stages. To each stage there corresponds a value of the supply current strength.

For example, it is possible to determine three stages of values for the parameter which correspond to the brightness during the day, at nightfall and during the night, respectively. To each of these stages there corresponds a strength of supply current. In this example, the three supply current strengths may correspond to 0.6, 0.9 and 2.6 amperes respectively, in accordance with FIG. 2.

The invention also proposes a device 30 for managing the supply to the discharge lamp 12 which device is depicted schematically in FIG. 3.

The management device 30 comprises the device 10 for supplying the discharge lamp 12, which device is connected to a measurement device 32 via a control module 34.

The measurement device 32 supplies a parameter which is representative of the environment of the vehicle. The parameter is supplied by the measurement device 32 in the form of an electric signal.

The control module 34 allows the electric signal to be processed so as to supply the electronic control unit 20 with a command C.

The management device 30 can operate in manual mode or automatic mode.

In manual mode, it is the driver of the vehicle who determines the time when the discharge lamps 12 of the vehicle headlights will be switched on. The switching-on of the lamps 12 is generally obtained by actuating a control lever 36 situated near the vehicle steering wheel 38. When the driver switches the lamps 12 on, the command C is supplied to the electronic control unit 20 so as to set the strength of the supply current and/or the maximum power supplied to the lamps 12 to optimize their life.

In an alternative, the switching-on of the lamps may be obtained by a voice-recognition device operated by the voice of the driver.

In automatic mode, no driver intervention is needed to determine the time when the lamps 12 will be switched on.

When the value of the parameter representative of the environment of the vehicle reaches a predetermined threshold value which corresponds to a brightness outside the vehicle that entails illuminating the road using the headlights, the control module 34 supplies the electronic control unit 20 with the command C to set the strength of the current supplied to the lamps 12 and/or their power to optimize their life.

It is possible to anticipate that, when the management device 30 is operating in automatic mode, manual determination on the part of the driver of the time at which to switch the lamps 12 on takes priority. That allows the driver to anticipate the switching-on of the lamps 12 so as to take into consideration certain information regarding the environment of the vehicle which is not taken into consideration by the parameter representative of the environment of the vehicle.

For example, when the parameter representative of the change in brightness outside the vehicle does not take account of the future change in this brightness, the driver of the vehicle can anticipate switching on the lamps 12 when approaching the entrance to a tunnel.

Selection between manual and automatic operating modes can be made by actuation of a "manual/automatic" rotary switch (not depicted) by the driver of the vehicle.

According to FIG. 3, the measurement device 32 may comprise an external-brightness sensor.

The brightness sensor may be arranged on the inside of the windscreen of the vehicle or of the glass of a headlight.

Certain vehicles are equipped with a rain sensor which sets off and/or controls the wiping speed of a wiper device according to the intensity of the rain.

In order to limit the cost of the management device 30, it is possible to couple the brightness sensor to such a rain detector.

The measurement device 32 may comprise a clock which provides the parameter representative of the environment of the vehicle on the basis of the time.

For example, the clock is programmed to make a parameter representative of the brightness outside the vehicle correspond to each time of the year for a given region or given country.

Thus, depending on the time at which the discharge lamps 12 are switched on, the clock makes it possible to determine the brightness outside the vehicle so as to supply the control module 34 with the parameter representative of the environment of the vehicle.

For example, in France, when the driver switches the headlights 12 on at midnight on December 24, the parameter supplied by the measurement device 32 is representative of a very low light level. The clock actually makes it possible to determine that, at that moment, it is night-time.

When the management device 30 is operating in automatic mode, the measurement device 32 which comprises a clock may make it possible to determine the time at which the lamps 12 are switched on. Depending on the day of the year, and on the global position of the vehicle, the measurement device 32 makes it possible to determine the moment at which the brightness outside is no longer sufficient and requires the lamps 12 to be switched on to illuminate the road and/or be correctly seen by the drivers of other vehicles.

The user of the vehicle may need lighting even though the timing corresponds to a daytime period; this is the case in particular when he is in a covered car park. In this eventuality, manual switching-on of the lamps 12 of the vehicle must take priority over the switching-on of the lamps 12 in automatic mode.

The measurement device 32 can also comprise a mapping system which supplies the parameter representative of the environment of the vehicle on the basis of the location of the vehicle.

The mapping system may, through various means, allow the position of the vehicle on the road network to be pinpointed.

Such a measurement device 32 is advantageously used for countries in which having the lamps 12 of the headlights switched on during the daytime is not compulsory.

As the vehicle is driving along, it may pass through regions in which the brightness is far lower than the brightness outside, which involve illuminating the road using the vehicle headlights. This is particular the case with tunnels. In this case, it is advantageous to predict the presence of such regions so as to adapt the control of the strength of the current supplied to the discharge lamps 12 according to the situation.

In automatic mode, the measurement device 32 which comprises a mapping system makes it possible in particular to anticipate the switching-on of the lamps 12 on the basis of the speed of the vehicle and its location with respect to the tunnels so that when the vehicle enters a tunnel, the intensity of the light flux emitted by the lamps 12 is sufficient. Anticipating switching on the lamps 12 in particular makes it possible to set the strength of the current supplied to the lamps 12 to a low value so as to limit the ageing of the electrodes and to optimize the life of the discharge lamps 12.

What is claimed:

1. A method of managing the supply to a discharge lamp of a motor vehicle headlight, wherein during the phase of starting up the discharge lamp, the strength of the current and/or the power supplied to the lamp is controlled on the basis of a parameter representative of the brightness outside the vehicle so as to optimize the life of the discharge lamp.

2. A management method according to claim 1, wherein the strength of the current and/or the power supplied to the lamp is limited to a value which is predetermined on the basis of the brightness outside the vehicle.

3. A management method according to claim 2, wherein the parameter is representative of the future change in brightness outside the vehicle.

4. A device for managing the supply to a discharge lamp of a motor vehicle headlight, which comprises a device for supplying the discharge lamp which controls the strength of the current supplied to the discharge lamp according to the method according to claim 2, wherein it comprises a device for measuring the brightness outside the vehicle.

5. A management method according to claim 1, wherein the parameter is representative of the future change in brightness outside the vehicle.

6. A device for managing the supply to a discharge lamp of a motor vehicle headlight, which comprises a device for supplying the discharge lamp which controls the strength of the current supplied to the discharge lamp according to the method according to claim 5, wherein it comprises a device for measuring the brightness outside the vehicle.

7. A device for managing the supply to a discharge lamp of a motor vehicle headlight, which comprises a device for supplying the discharge lamp which controls the strength of the current supplied to the discharge lamp according to the method according to claim 1, wherein it comprises a device for measuring the brightness outside the vehicle.

8. A management device according to claim 7, wherein the measurement device comprises an external-brightness sensor.

9. A management device according to claim 8, wherein the brightness sensor is designed to be arranged on the inside of a transparent wall, such as the windscreen of the vehicle or the headlight glass.

10. A management device according to claim 8, wherein the measurement device comprises a mapping system which provides the parameter representative of the vehicle environment on the basis of the location of the vehicle with respect to predetermined places such as a tunnel.

11. A management device according to claim 9, wherein the measurement device comprises a mapping system which provides the parameter representative of the vehicle environment on the basis of the location of the vehicle with respect to predetermined places such as a tunnel.

12. A management device according to claim 7, wherein the measurement device comprises a mapping system which provides the parameter representative of the vehicle environment on the basis of the location of the vehicle with respect to predetermined places such as a tunnel.

* * * * *